May 29, 1951   K. T. DAVIS   2,554,664
PIN HOLD DOWN MECHANISM
Filed April 8, 1949
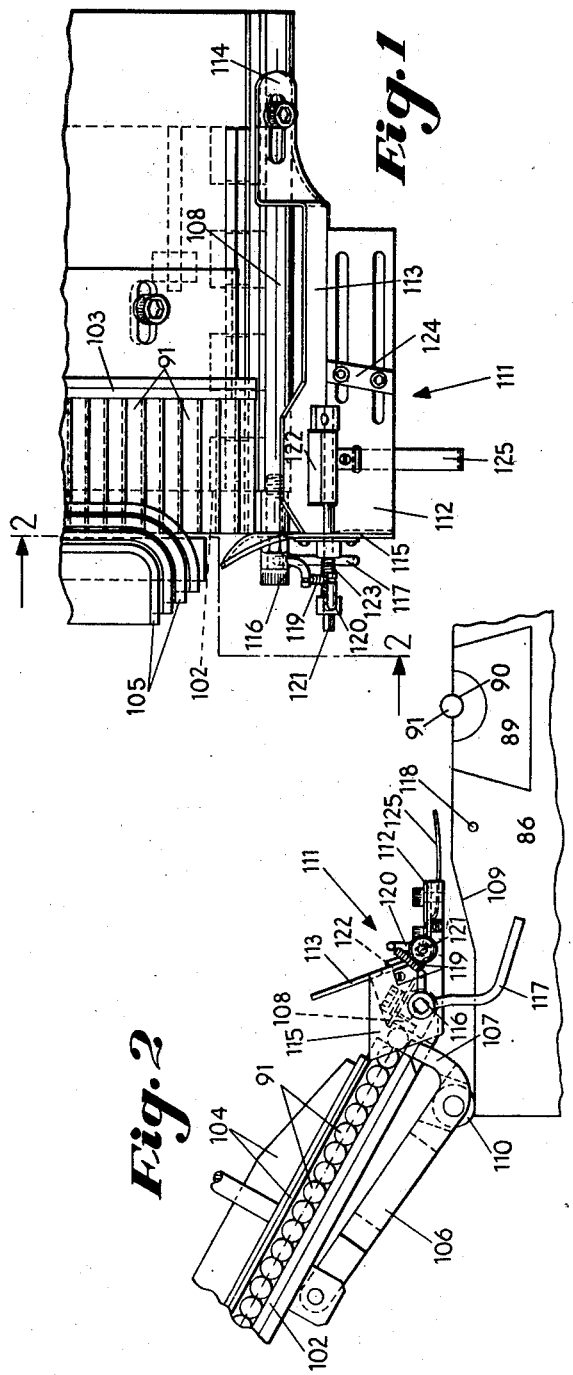
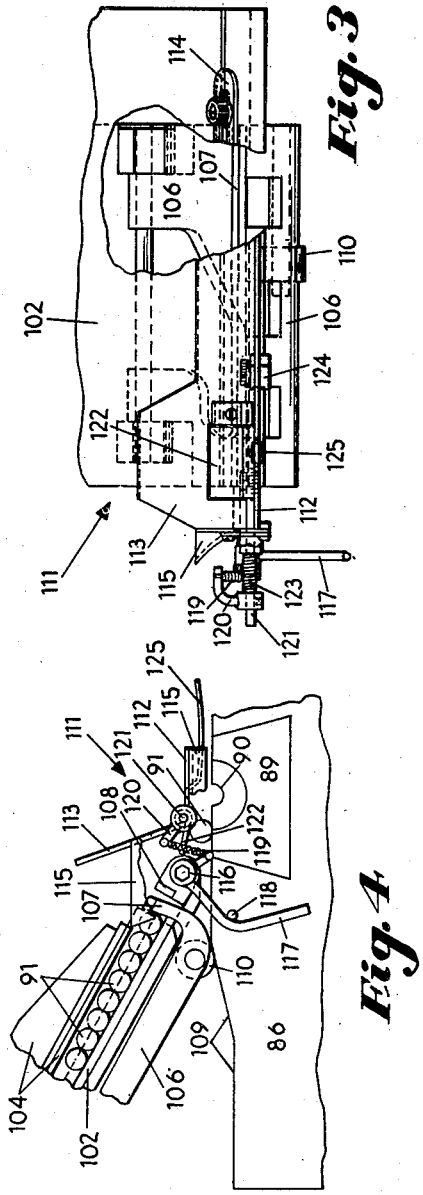
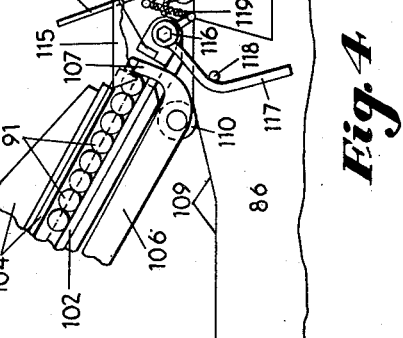
Inventor:
KENNETH T. DAVIS,
By
Attorney Patented May 29, 1951

2,554,664

UNITED STATES PATENT OFFICE 2,554,664

PIN HOLD-DOWN MECHANISM

Kenneth T. Davis, Columbus, Ohio, assignor to The Jeffrey Manufacturing Company, a corporation of Ohio Application April 8, 1949, Serial No. 86,265

6 Claims. (Cl. 10—162)

This invention relates to a pin hold down mechanism designed particularly for use in conjunction with a pin heading machine.

An object of the invention is to provide an efficient and simple means for insuring the delivery of pins to half of a split die which is carried in a reciprocating die block.

Other objects of the invention will appear hereinafter, the novel features and combinations being set forth in the appended claims.

In the accompanying drawings,

Fig. 1 is an enlarged plan view of the hold down mechanism and part of the associated pin supporting and heating mechanism;

Fig. 2 is a side elevational view of the device of Fig. 1, also showing a part of the reciprocating die block and associated die of the heading machine with which the hold down mechanism is associated;

Fig. 3 is a front elevational view of the device of Figs. 1 and 2; and

Fig. 4 is a view similar to Fig. 2, with parts broken away, showing particularly the operation of the hold down mechanism in cooperation with the pin just prior to the pin's being received by the lower die of the pin heading machine.

The pin hold down mechanism herein disclosed and claimed is also disclosed in the application of Fred J. Wright, Serial No. 71,465, filed January 18, 1949, entitled Hot Pin Heading Machine. Said mechanism is designed particularly for use in connection with the pin heading machine disclosed in detail and claimed in said Wright application. Certain parts of the pin heading machine are also disclosed in the instant application.

As disclosed in complete detail in said Wright application, the pin heading machine includes a horizontally reciprocating die block 86. Said die block 86 carries a removable lower clamping die 89 provided with a transverse semi-cylindrical pin receiving groove 90 adapted to receive a pin 91. The pins 91 are fed successively to the groove 90 by means of a downwardly sloping supporting plate 102 over which they slide by friction under the control of mechanism hereinafter described.

As best seen by reference to Fig. 1 of the drawings, there is an adjustable guide plate 103 carried by the supporting plate 102 which guides the pins 91 as they slide or travel by gravity down the inclined plate 102. An adjustable hold down bar 104 (see Figs. 2 and 4) is provided to hold the pins 91 on said plate 102. This bar is not shown in Figs. 1 and 3 of the drawings, in the interest of clearness.

The left-hand ends of the pins, as viewed in Fig. 1, project beyond the plate 102 and pass under the influence of the coils 105 of a high frequency induction heating unit which may be supplied with high frequency current from any desired source, such as a "TOCCO JR." unit.

Adjacent its forward end the plate 102 carries a pivoted feed arm 106 which has an upwardly extending head 107 which is positioned below the lowermost pin 91 and works between the lower end of the supporting plate 102 and a stop bar 108 which is carried by a bracket which forms in effect an extension of the pin supporting plate 102.

As clearly illustrated in Fig. 2 of the drawings, when the die block 86 and die 89 are in their "in" or pin clamping position the head 107 will rest beneath the lowermost pin 91. When the die block 86 is removed to its "out" or pin receiving position, as illustrated in Fig. 4 of the drawings, the cam surface 109 on the die block 86 cooperates with a roller 110 carried by the feed arm 106 to swing said feed arm about its pivot, thus moving the head 107 upwardly to push the pin over the stop bar 108 and allow it to roll into the pin groove 90 of the lower clamping die 89.

It has been found in practice that for some pins, depending upon their size and/or material, the pin is not always accurately received in the slot 90. To overcome this difficulty, the pin hold down mechanism 111, as disclosed in Figs. 1 to 4 of the drawings, was devised.

Pin hold down mechanism 111 includes a generally horizontal body plate or frame 112 to which is connected an upwardly inclined integrally formed bracket and pin guide plate 113 having a wing 114 provided with an elongated slot adapted to be releasably connected to the stop bar 108 to support the plate 112, 113 at one end. Adjacent the other end there is a generally vertical guide plate 115 which has an outwardly flared top and which is rigidly attached to the left-hand end of the plates 112 and 113, as viewed in Fig. 1 of the drawings.

Guide plate 115 acts as a guide and abutment plate for the left-hand or heated ends of the pins 91, as viewed in Fig. 1, guiding said pins as they are ejected by the head 107 and rolled over the top of the stop bar 108. The guide plate 115 is punched to receive a pivot stud 116 which has a double function of attaching the left-hand end of the pin hold down mechanism 111 to the stop bar 108 and providing a pivot to support a bell crank actuator 117. The actuator 117 has a downwardly extending curved arm which is adapted to be contacted by a pin 118 carried by the die block 86, as the die block 86 moves toward its outer or retracted position.

In Fig. 4 of the drawings the various parts are illustrated in which feed arm 106 has been actuated by cam 109 to push a pin 91 over the stop bar 108, which pin 91 was then guided by the guide plate 113 as it rolled over the curved lowermost nose of the stop bar 108 and fell onto a flat surface on the top of the die block 86 or die 89.

The parts are so timed that substantially at the instant the pin drops on top of the die block 86, or of the die 89 which constitutes a continuation thereof, the bell crank 117 will have been sufficiently moved from its inactive position, as illustrated in Fig. 2, to its active position, as illustrated in Fig. 4, so as to stretch a helical spring 119 extending between the upper arm of the crank 117 and a pivoted lever 120 sufficient to swing the lever 120 from its inactive position of Fig. 2 to its active position of Fig. 4.

The lever 120 is rigidly attached to a pivot rod 121 pivotally mounted on the plate 112 and carrying a rigidly attached wing, butterfly or flapper 122. The flapper 122, when inactive, is positioned within an opening in the plate 113 and in effect constitutes a part of it. The flapper can swing from the opening in plate 113, that is, from its inactive position as seen in Fig. 2 to its active position as seen in Fig. 4.

Thus when a pin 91 has been dropped onto the die block 86 or the die 89, as above mentioned, spring 119 will be tensioned sufficiently so as to swing the flapper 122 down over the pin 91 and hold it down against the upper surface of said die block 86 or die 89. The flapper 122 is biased to its inactive position by a helical spring 123 which surrounds the pivot rod 121, being attached to the hub of the lever 120 at one end, and to a stationary journal box on the plate 115 at the other end.

The two springs 119 and 123 cooperate so that a snap action in both directions is imparted to the flapper 122. That is, as bell crank 117 is swung rearwardly, or to the left, as viewed in Figs. 2 and 4, spring 119 will be expanded until it has adequate force to overcome spring 123. Flapper 122 will then snap from its inactive position of Fig. 2 to its active position of Fig. 4. Any further rearward movement of the die block 86 will merely further expand spring 119 without significant effect.

Fig. 4 shows the relation of the parts just prior to the die block 86 reaching its rearmost or outer position and under these conditions the pin 91 thereon will be rolling over the surface of the die 89, being guided by the flapper 122 and by the plate 115 adjacent one end thereof. The other end is guided by an adjustable guide block 124 which is adjustably mounted on the horizontal plate 112.

When the die block 86 reaches its rearmost position a pin 91 will have been rolled into the groove 90 and as the die block 86 moves forwardly the parts will ultimately assume the positions illustrated in Fig. 2, with a pin 91 carried in the die 89, as illustrated in said Fig. 2. There is also a hold down spring tongue 125 carried by the plate 112 and extending forwardly therefrom to hold the pin 91 in the groove 90 after said pin passes from under the plate 112.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In combination, pin feeding mechanism including a bar over which pins roll onto a horizontally reciprocating die block having a flat top pin supporting surface leading to a pin receiving groove, a pivoted flapper swingable against the top of a pin after it rolls over said bar onto said flat top surface, spring tensioning means operable by movement of said die block in one direction to swing said flapper from one position against said pin after it has rolled over said bar as aforesaid and operable by movement of said die block in the other direction to swing said flapper back to its first position whereby another pin can roll over said bar onto the pin supporting surface, and guide means for holding said pin on said flat top surface until it is rolled into said groove.

2. In combination, pin feeding mechanism including a bar over which pins roll onto a horizontally reciprocating die block having a flat top pin supporting surface, a pivoted flapper swingable against the top of a pin after it rolls over said bar onto said flat top surface, and means operable by movement of said die block in one direction to swing said flapper from one position against said pin after it has rolled over said bar as aforesaid and operable by movement of said die block in the other direction to swing said flapper back to its first position whereby another pin can roll over said bar onto the pin supporting surface of said die block.

3. In combination, pin feeding mechanism including a bar over which pins roll onto the top flat surface of a horizontally reciprocating die block, means including a pin guiding plate extending upwardly and over said block, a pivoted flapper on said plate spring biased to an upwardly inclined position and spaced from said bar to admit a pin between it and the bar as said pin rolls over the bar top, and means operable by rearwardly reciprocating movement of said die block to swing said flapper downwardly on a pin and hold the pin on said flat surface, said means including a resilient connection and a pivoted arm operated by said die block.

4. In combination, pin feeding mechanism including a bar over which pins roll onto the top flat surface of a horizontally reciprocating die block, means including a pin guiding plate extending upwardly and over said block, a pivoted flapper on said plate spring biased to an upwardly inclined position and spaced from said bar to admit a pin between it and the bar as said pin rolls over the bar top, and means operable by rearwardly reciprocating movement of said die block to swing said flapper downwardly on a pin and hold the pin on said flat surface.

5. In combination, pin feeding mechanism including a plate over which pins travel, a bar at one end of said plate over which pins roll one at a time, a horizontally reciprocating die block below said bar having a surface adapted to receive each pin after it has rolled over said bar, said surface leading to a pin receiving groove in said die block, a feed arm adapted to be moved by said die block to feed said pins one at a time over said bar, a pivoted flapper swingable against said pin after it has rolled over said bar and onto said surface, spring tensioning means operable by movement of said die block in one direction to move said flapper from one position against said pin after it has rolled over said bar as aforesaid and operable by movement of said die block in the other direction to swing said flapper to its first position whereby another pin can roll over said bar onto said die block surface, and guide means for holding said pin on said flat top surface until it is rolled into said groove.

6. In combination, pin feeding mechanism including a plate over which pins travel, a bar at one end of said plate over which pins roll one at a time, a horizontally reciprocating die block below said bar having a surface adapted to receive each pin after it has rolled over said bar, a feed arm adpted to be moved by said die block to feed said pins one at a time over said bar, a pivoted flapper swingable against said pin after it has rolled over said bar and onto said surface, and spring tensioning means operable by movement of said die block in one direction to move said flapper from one position against said pin after it has rolled over said bar as aforesaid and operable by movement of said die block in the other direction to swing said flapper to its first position whereby another pin can roll over said bar onto said die block surface.

KENNETH T. DAVIS.

REFERENCES CITED

The following references are of record in the file of this patent:

UNITED STATES PATENTS

| Number | Name | Date |
|---|---|---|
| 549,190 | Fox | Nov. 5, 1895 |
| 1,585,414 | Pritchard | May 18, 1926 |
| 2,271,844 | Olson | Feb. 3, 1942 |